(12) United States Patent
Nakajima et al.

(10) Patent No.: US 11,149,162 B2
(45) Date of Patent: Oct. 19, 2021

(54) AQUEOUS DISPERSION, COATING FILM, AND LAMINATE

(71) Applicant: SUMITOMO CHEMICAL COMPANY, LIMITED, Tokyo (JP)

(72) Inventors: Hideto Nakajima, Osaka (JP); Junji Morimoto, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 472 days.

(21) Appl. No.: 16/300,146

(22) PCT Filed: May 10, 2017

(86) PCT No.: PCT/JP2017/017693
§ 371 (c)(1),
(2) Date: Nov. 9, 2018

(87) PCT Pub. No.: WO2017/195828
PCT Pub. Date: Nov. 16, 2017

(65) Prior Publication Data
US 2019/0177568 A1 Jun. 13, 2019

(30) Foreign Application Priority Data

May 13, 2016 (JP) .............................. JP2016-097187

(51) Int. Cl.
| | | |
|---|---|---|
| C09D 123/26 | (2006.01) | |
| B32B 27/32 | (2006.01) | |
| C09D 123/08 | (2006.01) | |
| C09D 151/06 | (2006.01) | |
| C08K 5/17 | (2006.01) | |
| C08L 23/08 | (2006.01) | |
| C08L 51/06 | (2006.01) | |
| C08L 23/26 | (2006.01) | |
| C09D 7/63 | (2018.01) | |

(52) U.S. Cl.
CPC ............ *C09D 123/26* (2013.01); *B32B 27/32* (2013.01); *C08K 5/17* (2013.01); *C08L 23/08* (2013.01); *C08L 23/26* (2013.01); *C08L 51/06* (2013.01); *C09D 7/63* (2018.01); *C09D 123/08* (2013.01); *C09D 151/06* (2013.01)

(58) Field of Classification Search
None
See application file for complete search history.

(56) References Cited

U.S. PATENT DOCUMENTS

| 4,174,335 A | 11/1979 | Ohdaira et al. |
| 2009/0092847 A1 | 4/2009 | Onoe et al. |
| 2012/0100384 A1 | 4/2012 | Nagano et al. |
| 2013/0157051 A1 | 6/2013 | Nagano et al. |
| 2013/0266806 A1 | 10/2013 | Nagano et al. |

FOREIGN PATENT DOCUMENTS

| EP | 2 657 287 A1 | 10/2013 | |
| EP | 2 660 296 A1 | 11/2013 | |
| GB | 2495227 A | 4/2013 | |
| JP | 52-13539 A | 2/1977 | |
| JP | 3-122125 A | 5/1991 | |
| JP | 2001-163984 A | 6/2001 | |
| JP | 2008-31360 A | 2/2008 | |
| JP | 2008-303297 A | 12/2008 | |
| JP | 2008303297 A | * 12/2008 | |
| JP | 2009-1764 A | 1/2009 | |
| JP | 2009-287034 A | 12/2009 | |
| JP | 2011-25695 A | 2/2011 | |
| JP | 2012-144692 A | 8/2012 | |
| JP | 2012-188638 A | 10/2012 | |
| JP | 2017-57274 A | 3/2017 | |
| WO | 2008/054637 A1 | 5/2008 | |
| WO | 2011/118721 A1 | 9/2011 | |

OTHER PUBLICATIONS

JP2008303297 English Machine Translation prepared Apr. 13, 2021. (Year: 2021).*
Sun, et al, "Terpolymerization of Ethylene, Propylene and Butene-1 with Highly Active Supported Titanium Catalyst", Journal of Polymer Science: Part A: Polymer Chemistry, vol. 28, 1237-1254, 1990. (Year: 1990).*
Communication dated Apr. 27, 2020, from the China National Intellectual PropertyAdministration in application No. 201780029393.0.
Communication dated Jan. 13, 2021 from The Korean Intellectual Property Office in Application No. 10-2018-7032972.
International Search Report dated Aug. 15, 2017 issued by the International Bureau in PCT/JP2017/017693.
Communication dated Feb. 24, 2021, from the Japanese Patent Office in Application No. 2018-517057.

(Continued)

*Primary Examiner* — Christopher M Rodd
(74) *Attorney, Agent, or Firm* — Sughrue Mion, PLLC

(57) ABSTRACT

The present invention provides an aqueous dispersion comprising, (A) a highly modified polyolefin of a polyolefin (a) having a structural unit derived from ethylene and a structural unit derived from propylene and having a melting peak observed by differential scanning calorimetric analysis, by an α,β-unsaturated carboxylic acid compound, (B) a polyolefin (B-1) having a structural unit derived from at least one olefin selected from the group consisting of ethylene and α-olefins having 3 to 20 carbon atoms, and/or a lowly modified polyolefin (B-2) of the polyolefin (B-1) by an α,β-unsaturated carboxylic acid compound, and (C) a basic compound, wherein a mass ratio ((A)/(B)) of the component (A) and the component (B) is 60/40 to 97.5/2.5.

15 Claims, No Drawings

(56) References Cited

OTHER PUBLICATIONS

Communication dated Jan. 10, 2020 from European Patent Office in EP Application No. 17796188.5.
International Preliminary Report on Patentability with the translation of Written Opinion dated Nov. 22, 2018 issued by the International Bureau in PCT/JP2017/017693.

* cited by examiner

AQUEOUS DISPERSION, COATING FILM, AND LAMINATE

CROSS REFERENCE TO RELATED APPLICATIONS

This Application is a National Stage of International Application No. PCT/JP2017/017693 filed May 10, 2017, claiming priority based on Japanese Patent Application No. 2016-097187 filed May 13, 2016.

TECHNICAL FIELD

The present invention relates to an aqueous dispersion, a coating film, and a laminate.

BACKGROUND ART

Conventionally, polyolefins including propylene homopolymers and copolymers of propylene and α-olefin have been used in a wide range of fields including home appliances and automobile parts because polyolefins not only are excellent in mechanical properties, heat resistance, chemical resistance, water resistance, and the like, but also are inexpensive.

The surface of a substrate made of polyolefin is generally non-polar and low in adhesiveness to a substance other than polyolefin, and it is thus known that a coating film of an adhesive, a coating material, or the like is difficult to form on the surface of a substrate made of polyolefin. Such a substrate formed from polyolefin may be subjected to surface coating in order to suppress ease of scratching of the surface and enhance adhesiveness to, for example, a metal member.

As a composition for such surface coating, for example, Patent Literature 1 describes a composition comprising a resin where a non-crystalline polypropylene resin is modified by maleic anhydride, and Patent Literature 2 describes a composition (resin dispersion) comprising a hydrophilic polymer or a polymer prepared by binding an acidic group, in a propylene-α-olefin copolymer. In addition, Patent Literature 3 and Patent Literature 4 each describe a composition comprising a plurality of modified polyolefins used in combination.

CITATION LIST

Patent Literature

Patent Literature 1: JP 2009-1764 A
Patent Literature 2: JP 2009-287034 A
Patent Literature 3: JP 2012-188638 A
Patent Literature 4: JP 2012-144692 A

SUMMARY OF INVENTION

Technical Problem

Meanwhile, examples of the above-mentioned composition comprising modified polyolefins include an organic solvent-based composition used with modified polyolefins being dissolved in an organic solvent, and a water dispersion type composition (also referred to as "aqueous dispersion") used with modified polyolefins being dispersed in water. It is desirable to use the water dispersion type composition from the viewpoint of a reduction in the load on the environment.

On the other hand, however, water is low in affinity to a substrate made of polyolefin as compared with an organic solvent, and therefore the water dispersion type composition may be poorer in terms of close adhesiveness to such a substrate than the organic solvent-based composition. Additionally, the water dispersion type composition has the problem of being not necessarily favorable in dispersibility of modified polyolefins in water. Accordingly, for example, modified polyolefins and the composition applicable to the organic solvent-based composition cannot be diverted to the water dispersion type composition as they are, and it is necessary to separately examine modified polyolefins and the composition suitable for the water dispersion type composition so that such modified polyolefins are suitably dispersed in water.

The present inventors have made studies from such viewpoints, and have found that a conventional composition including a modified polyolefin (in particular, a water dispersion type composition) still has rooms for improvements in close adhesiveness to a substrate made of polyolefin, furthermore close adhesiveness to a substrate (in particular, a substrate having a polar surface) other than the substrate made of polyolefin, and also water resistance of a coating film obtained from such a composition.

An object of the present invention is to provide an aqueous dispersion capable of forming a coating film that is compatible with close adhesiveness to a substrate made of polyolefin and close adhesiveness to a substrate (in particular, a substrate having a polar surface) other than the substrate made of polyolefin, and also excellent in water resistance, and such a coating film, as well as a laminate provided with the coating film.

Solution to Problem

The present invention provides the following [1] to [16].
[1] An aqueous dispersion comprising, (A) a highly modified polyolefin of a polyolefin (a) having a structural unit derived from ethylene and a structural unit derived from propylene and having a melting peak observed by differential scanning calorimetric analysis, by an α,β-unsaturated carboxylic acid compound, (B) a polyolefin (B-1) having a structural unit derived from at least one olefin selected from the group consisting of ethylene and α-olefins having 3 to 20 carbon atoms, and/or a lowly modified polyolefin (B-2) of the polyolefin (B-1) by an α,β-unsaturated carboxylic acid compound, and (C) a basic compound, wherein a mass ratio ((A)/(B)) of the component (A) and the component (B) is 60/40 to 97.5/2.5.
[2] The aqueous dispersion according to [1], Wherein the component (A) is a highly graft-modified polyolefin of the polyolefin (a) by an α,β-unsaturated carboxylic acid compound, and the component (B-2) is a lowly graft-modified polyolefin of the polyolefin (B-1) by an α,β-unsaturated carboxylic acid compound.
[3] The aqueous dispersion according to [1] or [2], wherein an amount of a structural unit derived from an α,β-unsaturated carboxylic acid compound chemically bound to the polyolefin (a) in the component (A) is 2.0 to 50 parts by mass relative to 100 parts by mass of the component (A).
[4] The aqueous dispersion according to any one of [1] to [3], wherein the structural unit derived from ethylene in the polyolefin (a) occupies 5 to 30 mol % based on the total structural unit forming the polyolefin (a).
[5] The aqueous dispersion according to any one of [1] to [4], wherein a weight average molecular weight of the component (A) is 20000 to 200000.

[6] The aqueous dispersion according to any one of [1] to [5], wherein a melting point of the component (A), as measured by differential scanning calorimetric analysis, is 110° C. or less.

[7] The aqueous dispersion according to any one of [1] to [6], wherein an amount of a structural unit derived from an α,β-unsaturated carboxylic acid compound chemically bound to the polyolefin (B-1) in the polyolefin (B-2) is 0.001 parts by mass or more and less than 2.0 parts by mass relative to 100 parts by mass of the polyolefin (B-2).

[8] The aqueous dispersion according to any one of [1] to [7], wherein a weight average molecular weight of the component (B) is 5000 to 450000.

[9] The aqueous dispersion according to any one of [1] to [8], wherein a volume-based average particle size of a dispersoid in the aqueous dispersion is 2 μm or less.

[10] The aqueous dispersion according to any one of [1] to [9], wherein a proportion of a dispersoid having a particle size of 2 μm or more in the total dispersoid in the aqueous dispersion is 5% or less.

[11] The aqueous dispersion according to any one of [1] to [10], wherein the component (C) is an organic amine compound.

[12] A coating film comprising, (A) a highly modified polyolefin of a polyolefin (a) having a structural unit derived from ethylene and a structural unit derived from propylene and having a melting peak observed by differential scanning calorimetric analysis, (B) a polyolefin (B-1) having a structural unit derived from at least one olefin selected from the group consisting of ethylene and α-olefins having 3 to 20 carbon atoms, and/or (B-2) a lowly modified polyolefin of the polyolefin (B-1) by an α,β-unsaturated carboxylic acid compound, and (C) a basic compound, wherein a mass ratio ((A)/(B)) of the component (A) and the component (B) is 60/40 to 97.5/2.5.

[13] A coating film formed from the aqueous dispersion according to any one of [1] to [11].

[14] A laminate comprising, a substrate having a non-polar surface, and the coating film according to [12] or [13], laminated on the non-polar surface of the substrate.

[15] The laminate according to [14], wherein the substrate having a non-polar surface is a substrate made of polyolefin.

[16] The laminate according to [14] or [15], further comprising a substrate having a polar surface, laminated on a surface of the coating film, the surface being opposite to the substrate having the non-polar surface.

Advantageous Effects of Invention

According to the present invention, there can be provided an aqueous dispersion capable of forming a coating film that is compatible with close adhesiveness to a substrate made of polyolefin and close adhesiveness to a substrate (in particular, a substrate having a polar surface) other than the substrate made of polyolefin, and also excellent in water resistance, and such a coating film, as well as a laminate provided with the coating film.

DESCRIPTION OF EMBODIMENTS

An aqueous dispersion according to the present embodiment comprises the following component (A), component (B) and component (C).

Component (A): a highly modified polyolefin of a polyolefin (a) having a structural unit derived from ethylene and a structural unit derived from propylene and having a melting peak observed by differential scanning calorimetric analysis, by an α,β-unsaturated carboxylic acid compound Component (B): a polyolefin (B-1) having a structural unit derived from at least one olefin selected from the group consisting of ethylene and α-olefins having 3 to 20 carbon atoms, and/or a lowly modified polyolefin (B-2) of the polyolefin (B-1) by an α,β-unsaturated carboxylic acid compound Component (C): a basic compound The component (A) is a highly modified polyolefin of the polyolefin (a) by an α,β-unsaturated carboxylic acid compound, and is obtained by modifying the polyolefin (a) by the α,β-unsaturated carboxylic acid compound. The highly modified polyolefin here means a modified polyolefin where the amount of the structural unit derived from the α,β-unsaturated carboxylic acid compound chemically bound to the polyolefin (a) is 2.0 parts by mass or more relative to 100 parts by mass of the component (A). Modification by the α,β-unsaturated carboxylic acid compound may be graft modification or copolymerization. The component (A) is preferably a highly graft-modified polyolefin of the polyolefin (a) by the α,β-unsaturated carboxylic acid compound.

The polyolefin (a) has at least a structural unit derived from ethylene and a structural unit derived from propylene.

The amount of the structural unit derived from ethylene is usually 5 to 30 mol %, preferably 5 to 20 mol %, more preferably 5 to 19 mol %, further preferably 10 to 19 mol %, particularly preferably 11 to 18 mol % and most preferably 11 to 17 mol % based on the total structural unit forming the polyolefin (a).

The amount of the structural unit derived from propylene is usually 70 to 95 mol %, preferably 80 to 95 mol %, more preferably 81 to 95 mol %, further preferably 81 to 90 mol %, particularly preferably 82 to 89 mol %, and most preferably 83 to 89 mol % based on the total structural unit forming the polyolefin (a).

The polyolefin (a) may be formed of only the structural unit derived from ethylene and the structural unit derived from propylene, or may have other structural unit(s) in addition to the structural unit derived from ethylene and the structural unit derived from propylene. Examples of such other structural unit(s) include structural units derived from α-olefins having 4 to 20 carbon atoms, cyclic olefins, a vinyl aromatic compound, and a polyene compound.

Examples of the α-olefins having 4 to 20 carbon atoms include linear α-olefins such as 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene.

Examples of the cyclic olefins include norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 5-vinylnorbornene, 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-ethylidene-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2,3- dichloro-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxylnorbornene anhydrate, 5-dimethylaminonorbornene, 5-cyananorbornene, cyclopentene, 3-methylcyclopentene, 4-methylcyclopentene, 3,4-dimethylcyclopentene, 3,5-dimethylcyclopentene, 3-chlorocyclopentene, cyclohexene, 3-methylcyclohexene, 4-methylcyclohexene, 3,4-dimethylcyclohexene, 3-chlorocyclohexene, cycloheptene, vinylcyclohexane, and the like.

Examples of the vinyl aromatic compound include styrene, α-methylstyrene, p-methylstyrene, vinylxylene, monochlorostyrene, dichlorostyrene, monobromostyrene, dibromostyrene, fluorostyrene, p-tert-butylstyrene, ethylstyrene, vinylnaphthalene, and the like.

Examples of the polyene compound include a conjugated polyene compound and a non-conjugated polyene compound. Examples of the conjugated polyene compound include aliphatic conjugated polyene compounds such as a linear aliphatic conjugated polyene compound, a branched aliphatic conjugated polyene compound, and an alicyclic conjugated polyene compound. Examples of the non-conjugated polyene compound include an aliphatic non-conjugated polyene compound and an alicyclic non-conjugated polyene compound. Other examples of the polyene compound also include an aromatic polyene compound. These polyene compounds may each have an alkoxy group, an aryl group, an aryloxy group, an aralkyl group, an aralkyloxy group, and the like.

Examples of the aliphatic conjugated polyene compounds include 1,3-butadiene, isoprene, 2-ethyl-1,3-butadiene, 2-propyl-1,3-butadiene, 2-isopropyl-1,3-butadiene, 2-hexyl-1,3-butadiene, 2,3-dimethyl-1,3-butadiene, 2,3-diethyl-1,3-butadiene, 2-methyl-1,3-pentadiene, 2-methyl-1,3-hexadiene, 2-methyl-1,3-octadiene, 2-methyl-1,3-decadiene, 2,3-dimethyl-1,3-pentadiene, 2,3-dimethyl-1,3-hexadiene, 2,3-dimethyl-1,3-octadiene, 2,3-dimethyl-1,3-decadiene, and the like.

Examples of the alicyclic conjugated polyene compound include 2-methyl-1,3-cyclopentadiene, 2-methyl-1,3-cyclohexadiene, 2,3-dimethyl-1,3-cyclopentadiene, 2,3-dimethyl-1,3-cyclohexadiene, 2-chloro-1,3-butadiene, 2,3-dichloro-1,3-butadiene, 1-fluoro-1,3-butadiene, 2-chloro-1,3-pentadiene, 2-chloro-1,3-cyclopentadiene, 2-chloro-1,3-cyclohexadiene, and the like.

Examples of the aliphatic non-conjugated polyene compound include 1,4-hexadiene, 1,5-hexadiene, 1,6-heptadiene, 1,6-octadiene, 1,7-octadiene, 1,8-nonadiene, 1,9-decadiene, 1,13-tetradecadiene, 1,5,9-decatriene, 3-methyl-1,4-hexadiene, 4-methyl-1,4-hexadiene, 5-methyl-1,4-hexadiene, 4-ethyl-1,4-hexadiene, 3-methyl-1,5-hexadiene, 3,3-dimethyl-1,4-hexadiene, 3,4-dimethyl-1,5-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 3-methyl-1,6-heptadiene, 4-methyl-1,6-heptadiene, 4,4-dimethyl-1,6-heptadiene, 4-ethyl-1,6-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene, 9-methyl-1,8-undecadiene, 6,10-dimethyl-1,5,9-undecatriene, 5,9-dimethyl-1,4,8-decatriene, 4-ethylidene-8-methyl-1,7-nonadiene, 13-ethyl-9-methyl-1,9,12-pentadecatriene, 5,9,13-trimethyl-1,4,8,12-tetradecadiene, 8,14,16-trimethyl-1,7,14-hexadecatriene, 4-ethylidene-12-methyl-1,11-pentadecadiene, and the like.

Examples of the alicyclic non-conjugated polyene compound include vinylcyclohexene, 5-vinyl-2-norbornene, 5-ethylidene-2-norbornene, 5-methylene-2-norbornene, 5-isopropenyl-2-norbornene, cyclohexadiene, dicyclopentadiene, cyclooctadiene, 2,5-norbornadiene, 2-methyl-2,5-norbornadiene, 2-ethyl-2,5-norbornadiene, 2,3-diisopropylidene-5-norbornene, 2-ethylidene-3-isopropylidene-5-norbornene, 6-chloromethyl-5-isopropenyl-2-norbornene, 1,4-divinylcyclohexane, 1,3-divinylcyclohexane, 1,3-divinylcyclopentane, 1,5-divinylcyclooctane, 1-allyl-4-vinylcyclohexane, 1,4-diallylcyclohexane, 1-allyl-5 cyclooctane, 1,5-diallylcyclooctane, 1-allyl-4-isopropenylcyclohexane, 1-isopropenyl-4-vinylcyclohexane, 1-isopropenyl-3-vinylcyclopentane, methyl tetrahydroindene, and the like.

Examples of the aromatic polyene compound include divinylbenzene, vinylisopropenylbenzene, and the like.

In the case where the polyolefin (a) has other structural unit(s), the total amount of the structural unit derived from ethylene and the structural unit derived from propylene is preferably 85 mol % or more, more preferably 91 mol % or more, and further preferably 96 mol % or more based on the total structural unit forming the polyolefin (a). In other words, the amount of such other structural unit(s) is preferably 15 mol % or less, more preferably 9 mol % or less, and further preferably 4 mol % or less based on the total structural unit forming the polyolefin (a).

The polyolefin (a) is a polymer having a melting peak observed by differential scanning calorimetry (DSC) (hereinafter, also simply referred to as "melting peak"). The phrase "having a melting peak observed by differential scanning calorimetry (DSC)" means that a crystal melting peak having a crystal melting heat quantity of 1 J/g or more is observed in the temperature range from −100 to 200° C. The polyolefin (a) is more preferably a polymer in which both a crystal melting peak having a crystal melting heat quantity of 1 J/g or more and a crystallization peak having a crystallization heat quantity of 1 J/g or more in the temperature range from −100 to 200° C. are observed.

The polyolefin (a) is produced by using a known Ziegler-Natta type catalyst or a known single site catalyst (for example, metallocene-based catalyst), and is preferably produced by using a known single site catalyst (for example, metallocene-based catalyst) from the viewpoint of an enhancement in heat resistance of a dry coating film of the aqueous dispersion.

The α,β-unsaturated carboxylic acid compound for modifying the polyolefin (a) encompasses α,β-unsaturated carboxylic acids and derivatives thereof. Examples thereof include α,β-unsaturated carboxylic acids such as (meth)acrylic acid, fumaric acid, maleic acid, itaconic acid, crotonic acid, and citraconic acid; α,β-unsaturated carboxylic acid anhydrides such as maleic anhydride, itaconic anhydride, and citraconic anhydride; α,β-unsaturated carboxylic acid esters such as methyl maleate, methyl itaconate, methyl citraconate, methyl (meth)acrylate, ethyl (meth)acrylate, propyl (meth)acrylate, butyl (meth)acrylate, glycidyl (meth) acrylate, 2-hydroxyethyl (meth)acrylate, 2-hydroxypropyl (meth)acrylate, (2-isocyanato)ethyl (meth)acrylate, (dimethylamino) (meth)acrylate, (meth)acrylamide, an esterified product of methacrylic acid and alcohol, 2-ethylhexyl (meth)acrylate, dodecyl (meth)acrylate, tridecyl (meth)acrylate, and stearyl (meth)acrylate; and unsaturated carboxylic acid amides and imides, such as (meth)acrylic acid amide, maleic acid monoamide, and maleimide. These α,β-unsaturated carboxylic acid compounds may be used in combinations of two or more kinds thereof. The number of carbon atoms in a group represented by R in an ester moiety (—CO—O—R) of (meth)acrylate is preferably 4 or more, more preferably 6 or more, further preferably 8 or more, and usually 20 or less. For example, the number of carbon atoms in the group represented by R in the ester moiety of butyl (meth)acrylate is 4. The α,β-unsaturated carboxylic acid is preferably maleic acid or maleic anhydride, and more preferably maleic anhydride. In the present invention, acrylic acid and methacrylic acid are collectively referred to as "(meth)acrylic acid", and acrylate and methacrylate are collectively referred to as "(meth)acrylate".

In the case where any α,β-unsaturated carboxylic acid anhydride and any α,β-unsaturated carboxylic acid ester are used in combination, the molar ratio thereof preferably satisfies α,β-unsaturated carboxylic acid anhydride/α,β-unsaturated carboxylic acid ester=0.3 to 3, more preferably satisfies, α,β-unsaturated carboxylic acid anhydride/α,β-unsaturated carboxylic acid ester=0.5 to 3, and further preferably satisfies α,β-unsaturated carboxylic acid anhydride/α,β-unsaturated carboxylic acid ester=0.5 to 2.

Examples of the method for producing the component (A) include a method where the polyolefin (a) is molten and thereafter the α,β-unsaturated carboxylic acid compound is added for modification, a method where the polyolefin (a) is dissolved or suspended in a solvent such as toluene or xylene and thereafter the α,β-unsaturated carboxylic acid compound is added for modification, and a method where the raw material monomer of the polyolefin (a) and the α,β-unsaturated carboxylic acid compound are copolymerized.

Since any of known various methods for mixing resins with each other or a resin with a solid or liquid additive can be adopted as the method where the polyolefin (a) is molten and thereafter the α,β-unsaturated carboxylic acid compound is added for modification, and it is thus preferable to conduct melt-kneading by use of an extruder. More preferable examples include a method where all or some of respective components are combined and separately mixed by a Henschel mixer, a ribbon blender, a blender, or the like to form a uniform mixture, and thereafter the mixture is melt-kneaded. As a melt-kneading system, a conventionally known kneading system such as a Bunbury mixer, a plastomill, Brabender Plastograph, or a uniaxial or biaxial extruder can be widely adopted. A uniaxial or biaxial extruder is used as the melt-kneading system from the viewpoint that continuous production can be made to enhance productivity, and a method is preferably used where the polyolefin (a), the α,β-unsaturated carboxylic acid compound, and a radical initiator preliminarily sufficiently mixed in advance are fed through a feed port of the extruder and kneaded.

Examples of the method where the polyolefin (a) is dissolved or suspended in a solvent such as toluene or xylene and thereafter the α,β-unsaturated carboxylic acid compound is added for modification include a method where the polyolefin (a), the α,β-unsaturated carboxylic acid compound, and a radical initiator are appropriately loaded in a solvent in any order or at the same time, and the polyolefin (a) is dissolved or suspended in a solvent and modified by the α,β-unsaturated carboxylic acid compound usually under heating.

Examples of the method where the raw material monomer of the polyolefin (a) and the α,β-unsaturated carboxylic acid compound are copolymerized include a known method such as a radial polymerization method. For example, the polymerization may be performed by melting the raw material monomer and thereafter adding the α,β-unsaturated carboxylic acid compound, or the polymerization may be performed by dissolving the raw material monomer in a solvent such as toluene and thereafter adding the α,β-unsaturated carboxylic acid compound. In the case where the α,β-unsaturated carboxylic acid compound includes α,β-unsaturated carboxylic acid anhydride, the structural unit derived from the α,β-unsaturated carboxylic acid anhydride in the component (A) may retain an anhydride group (—CO—O—CO—), may have a structure where an anhydride group is ring-opened, or may include both of them.

The amount of the solvent to be used may be any amount which enables the polyolefin (a) to be dissolved or suspended. The amount of the solvent to be used may be, for example, 5 to 1000 parts by mass, 1 to 300 parts by mass or 1 to 100 parts by mass relative to 100 parts by mass of the polyolefin (a).

The amount of the radical initiator to be added is, for example, 0.1 to 10 parts by mass, and preferably 0.2 to 5 parts by mass relative to 100 parts by mass of the polyolefin (a). When the amount to be added is 0.1 parts by mass or more, the amount of the polyolefin (a) to be modified tends to be ensured, thereby allowing the aqueous dispersion not to be too high in viscosity and to be facilitated in handling, and when the amount to be added is 10 parts by mass or less, the content of an unreacted radical initiator in the resulting component (A) tends to be reduced, thereby allowing the aqueous dispersion to be further excellent in close adhesiveness.

The radical initiator is, for example, an organic peroxide, and is preferably an organic peroxide whose decomposition temperature at a half-life of 1 hour is 50 to 160° C. When the decomposition temperature is 50° C. or more, the amount of modification tends to be enhanced, and when the decomposition temperature is 160° C. or less, decomposition of the polyolefin (a) tends to be decreased. Such an organic peroxide preferably has the effect of abstraction of proton from the polyolefin (a) after decomposition and radical generation.

Examples of the organic peroxide whose decomposition temperature at a half-life of 1 hour is 50 to 160° C. include a diacyl peroxide compound, a dialkyl peroxide compound, a peroxyketal compound, an alkyl perester compound, and a percarbonate compound. Specific examples of such an organic peroxide include dicetyl peroxydicarbonate, di-3-methoxybutyl peroxydicarbonate, di-2-ethylhexyl peroxydicarbonate, bis(4-t-butylcyclohexyl) peroxydicarbonate, diisopropyl peroxydicarbonate, t-butyl peroxyisopropylcarbonate, dimyristyl peroxycarbonate, diisopropyl peroxydicarbonate, 1,1,3,3-tetramethylbutyl neodecanoate, α-cumyl peroxyneodecanoate, t-butyl peroxyneodecanoate, t-butyl peroxyneoheptanoate, 1,1 bis(t- butylperoxy)cyclohexane, 2,2 bis(4,4-di-t-butylperoxycyclohexyl)propane, 1,1-bis(t-butylperoxy)cyclododecane, t-hexylperoxyisopropyl monocarbonate, t-butyl peroxy-3,5,5-trimethylhexanoate, t-butyl peroxylaurate, 2,5 dimethyl-2,5-di(benzoylperoxy)hexane, t-butyl peroxyacetate, 2,2-bis(t-butylperoxy)butene, t-butyl peroxybenzoate, di-(3,5,5-trimethylhexanoyl)peroxide, n-butyl-4,4-bis(t-peroxy)valerate, di-t-butyl peroxyisophthalate, dicumyl peroxide, α-α'-bis(t-butylperoxy-m-isopropyl)benzene, 2,5-dimethyl-2,5-di(t-butylperoxy)hexane, 1,3-bis(t-butylperoxyisopropyl)benzene, t-butylcumyl peroxide, di-t-butyl peroxide, p-menthane hydroperoxide, and 2,5-dimethyl-2,5-di(t-butylperoxy)hexyne-3. Among them, the organic peroxide is preferably a dialkyl peroxide compound, a diacyl peroxide compound, a percarbonate compound, or an alkyl perester compound.

The amount of the α,β-unsaturated carboxylic acid compound to be added is, for example, 5 to 60 parts by mass, preferably 5 to 40 parts by mass relative to 100 parts by mass of the polyolefin (a). When the amount to be added is 5 parts by mass or more, such an amount is suitable from the viewpoint that a desired amount of the polyolefin (a) to be modified is achieved, and the aqueous dispersion tends to be not too high in viscosity and to be facilitated in handling. When the amount to be added is 60 parts by mass or less, the content of an unreacted α,β-unsaturated carboxylic acid compound in the resulting component (A) tends to be reduced, thereby allowing the aqueous dispersion to be further excellent in close adhesiveness.

The structural unit derived from the α,β-unsaturated carboxylic acid compound chemically bound to the polyolefin (a) may have an acid anhydride group (—CO—O—CO—) where a ring structure is retained, may have a group where an acid anhydride group is ring-opened, or may have both an acid anhydride group where a ring structure is retained and a group where an acid anhydride group is ring-opened.

The amount of the structural unit derived from the α,β-unsaturated carboxylic acid compound chemically bound to the polyolefin (a) in the component (A) is preferably 2.0 to 50 parts by mass, more preferably 2.0 to 40 parts by mass, further preferably 2.0 to 30 parts by mass, still more preferably 2.0 to 15 parts by mass, and particularly preferably 2.0 to 10 parts by mass relative to 100 parts by mass of the component (A).

The weight average molecular weight (Mw) of the component (A) is preferably 20000 to 200000, preferably 25000 to 150000, more preferably 30000 to 150000. When the Mw of the component (A) is 20000 or more, the aqueous dispersion is further excellent in close adhesiveness, and when the Mw is 200000 or less, the particle size in the aqueous dispersion is reduced and the aqueous dispersion is excellent in stability. Herein, the weight average molecular weight (Mw), the number average molecular weight (Mn), and the molecular weight distribution (Mw/Mn) each mean the value in terms of standard polystyrene, as measured by gel permeation chromatography (GPC).

The melting point of the component (A), as measured by differential scanning calorimetric analysis (DSC), is preferably 110° C. or less, more preferably 100° C. or less, and further preferably 90° C. or less. When such a melting point is 110° C. or less, the heat treatment temperature in an adhesion step can be reduced, and energy saving in a process is achieved.

The component (A) may be a modified polyolefin where the highly modified polyolefin by the α,β-unsaturated carboxylic acid compound is further modified by chlorine. The modification by chlorine is performed by, for example, dissolving the highly modified polyolefin by the α,β-unsaturated carboxylic acid compound in a chlorinated solvent, and blowing a chlorine gas to the solution or ununiform dispersion at normal pressure or under pressure under irradiation with ultraviolet light or in the presence of a catalyst including peroxide such as benzoyl peroxide, to allow a reaction to run.

The component (B) is at least one selected from the following polyolefin (B-1) and lowly modified polyolefin (B-2).

Polyolefin (B-1): a (unmodified) polyolefin having a structural unit derived from at least one olefin selected from ethylene and α-olefins having 3 to 20 carbon atoms Lowly modified polyolefin (B-2): a lowly modified polyolefin of the polyolefin (B-1) by an α,β-unsaturated carboxylic acid compound Examples of the α-olefins having 3 to 20 carbon atoms include linear α-olefins such as propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene.

The polyolefin (B-1) may be formed of only a structural unit derived from at least one olefin selected from ethylene and α-olefins having 3 to 20 carbon atoms, or may have other structural unit(s), in addition to such a structural unit derived from olefin selected from ethylene and α-olefins having 3 to 20 carbon atoms. Examples of such other structural unit(s) include a structural unit derived from a cyclic olefin, a vinyl aromatic compound, and a polyene compound.

As the cyclic olefin, the vinyl aromatic compound, and the polyene compound, the same compounds as the cyclic olefin, the vinyl aromatic compound, and the polyene compound described in the component (A) are used, respectively.

In the case where the poly olefin. (B-1) has other structural unit(s), the amount of the structural unit derived from the olefin selected from ethylene and α-olefins having 3 to 20 carbon atoms is preferably 72 mol % or more, more preferably 81 mol % or more, further preferably 96 mol % or more based on the total structural unit forming the polyolefin (B-1). In other words, the amount of such other structural unit(s) is preferably 28 mol % or less, more preferably 19 mol % or less, further preferably 4 mol % or less based on the total structural unit forming the polyolefin (B-1).

The polyolefin (B-1) may be a polymer having a melting peak observed by differential scanning calorimetry (DSC), or may be a polymer in which such a melting peak is not substantially observed. The phrase "having a melting peak" means the same as described in the component (A). The phrase "a melting peak is not substantially observed" means that any crystal melting peak having a crystal melting heat quantity of 1 J/g or more in the temperature range from −100 to 200° C. is not observed.

The polyolefin (B-1) is preferably a polymer having a melting peak from the viewpoint of water resistance of a dry coating film of the aqueous dispersion. The polyolefin (B-1) is preferably a polymer in which a melting peak is not substantially observed from the viewpoint that pressure-sensitive adhesiveness is excellent and the aqueous dispersion is further excellent in close adhesiveness. The polyolefin (B-1) is more preferably a polymer in which any of a crystal melting peak having a crystal melting heat quantity of 1 J/g or more and a crystallization peak having a crystallization heat quantity of 1 J/g or more in the temperature range from −100 to 200° C. is not observed.

The polyolefin (B-1) is produced by using a known Ziegler-Natta type catalyst or a known single site catalyst (for example, metallocene-based catalyst), and is preferably produced by using a known single site catalyst (for example, metallocene-based catalyst) from the viewpoint of an enhancement in heat resistance of the aqueous dispersion. The polyolefin (B-1) is a polymer modified by no α,β-unsaturated carboxylic acid compound.

The polyolefin (B-2) is a lowly modified polyolefin of the polyolefin (B-1) by an α,β-unsaturated carboxylic acid compound, and is obtained by modifying the polyolefin (B-1) by an α,β-unsaturated carboxylic acid compound. The lowly modified polyolefin here means a modified polyolefin where the amount of the structural unit derived from the α,β-unsaturated carboxylic acid compound chemically bound to the polyolefin (B-1) is less than 2.0 parts by mass relative to 100 parts by mass of the polyolefin (B-2). The amount of the structural unit derived from the α,β-unsaturated carboxylic acid compound chemically bound to the polyolefin (B-1) is preferably more than 0.0 parts by mass and 1.0 part by mass or less relative to 100 parts by mass of the polyolefin (B-2). The lowly modified polyolefin is preferably a lowly graft-modified polyolefin.

As the α,β-unsaturated carboxylic acid compound for modifying the polyolefin (B-1), the α,β-unsaturated carboxylic acid compound described in the component (A) is used.

As the method for producing the polyolefin (B-2), the production method described for the component (A), where the polyolefin (a) is replaced with the polyolefin (B-1), is used.

The amount of the α,β-unsaturated carboxylic acid compound to be added is, for example, 0.001 to 5 parts by mass, and preferably 0.001 to 3 parts by mass relative to 100 parts by mass of the polyolefin (B-1).

The structural unit derived from the α,β-unsaturated carboxylic acid compound chemically bound to the polyolefin (B-1) may have an acid anhydride group (—CO—O—CO—) where a ring structure is retained, may have a group where an acid anhydride group is ring-opened, or may have both an acid anhydride group where a ring structure is retained and a group where an acid anhydride group is ring-opened.

The amount of the structural unit derived from the α,β-unsaturated carboxylic acid compound chemically bound to the (B-1) is preferably 0.001 parts by mass or mare and less than 2.0 parts by mass, more preferably 0.001 to 1.8 parts by mass, and further preferably 0.001 to 1.5 parts by mass relative to 100 parts by mass of the polyolefin (B-2).

The weight average molecular weight (Mw) of the component (B) is preferably 5000 to 450000, preferably 15000 to 350000, more preferably 25000 to 250000. When the Mw of the component (B) is 5000 or more, the aqueous dispersion is further excellent in close adhesiveness, and when the Mw is 450000 or less, the aqueous dispersion is not too high in viscosity and is facilitated in handling.

In the case where the component (B) is a polymer having a melting peak, the melting point of the polymer, as measured by differential scanning calorimetric analysis (DSC), is preferably 130° C. or less, more preferably 120° C. or less, further preferably 100° C. or less. When such a melting point is 130° C. or less, the heat treatment temperature in an adhesion step can be reduced, and energy saving in a process is achieved.

A compound which can neutralize a carboxyl group present in the aqueous dispersion is used as the component (C). The component (C) may be, for example, ammonia, an organic amine compound, or a metal hydroxide, preferably ammonia or an organic amine compound, and more preferably an organic amine compound having a boiling point of 200° C. or less. In the case where the organic amine compound having a boiling point of 200° C. or less is used, the organic amine compound can be easily volatilized by usual drying, and water resistance and alkaline resistance of a coating film can be maintained or enhanced in the case where such a coating film is formed by using the aqueous dispersion.

Examples of the organic amine compound include triethylamine, N, N-dimethylethanolamine, aminoethanolamine, N-methyl-N, N-diethanolamine, isopropylamine, iminobispropylamine, ethylamine, diethylamine, 3-ethoxypropylamine, 3-diethylaminopropylamine, sec-butylamine, propylamine, methylaminopropylamine, 3-methoxypropylamine, monoethanolamine, morpholine, N-methylmorpholine, N-ethylmorpholine, and the like. Among them, the organic amine compound is preferably N, N-dimethylethanolamine. Examples of the metal hydroxide include lithium hydroxide, potassium hydroxide, sodium hydroxide, and the like.

The content of the component (C) is, for example, 1 to 20 parts by mass, more preferably 2 to 15 parts by mass, and further preferably 2 to 10 parts by mass relative to 100 parts by mass of the total amount of the component (A) and the component (B). Herein, in the case where the aqueous dispersion contains two or more components as the component (A), (B) or (C), the content of each of the component above means a total amount of the two or more components.

The mass ratio ((A)/(B)) of the component (A) and the component (B) is preferably 60/40 or more, more preferably 65/35 or more, and further preferably 80/20 or more from the viewpoint that close adhesiveness of the aqueous dispersion is excellent. The mass ratio ((A)/(B)) of the component (A) and the component (B) may be, for example, 97.5/2.5 or less, 95/5 or less, or 92.5/7.5 or less.

The mass ratio ((A)/(B)) of the component (A) and the component (B) is preferably 60/40 to 97.5/2.5, more preferably 65/35 to 95/5, and further preferably 70/30 to 92.5/7.5.

The aqueous dispersion comprising the component (A), the component (B) and the component (C) can be produced by using a known method in the art, for example, a post-emulsification method where a resin to be emulsified is produced and thereafter the resin is dispersed in an aqueous medium (for example, a forced emulsification method, a self-emulsification method, or a phase-transfer emulsification method). For example, a dispersion liquid where the component (A) is dispersed in an aqueous medium, and a dispersion liquid where the component (B) is dispersed in an aqueous medium may be each separately prepared, and thereafter the resulting two dispersion liquids may be mixed, or the component (A) and the component (B) may be mixed in advance and thereafter dispersed in an aqueous medium. It is preferable that the component (A) and the component (B) be mixed in advance and thereafter dispersed in an aqueous medium.

Specific examples include (1) a method for producing the aqueous dispersion by preparing a mixture of a resin to be emulsified, with water and a solvent other than water, in a reactor, and then removing the solvent other than water from the mixture, and (2) a method for producing the dispersion by melting a resin to be emulsified, at a temperature equal to or more than the temperature where the resin is molten, in a kneading machine, and thereafter adding water thereto.

In preparation of the mixture by such a method, heating and/or stirring may be, if necessary, performed. Such heating can be performed at, for example, 50 to 200° C., preferably 60 to 150° C., and more preferably 70 to 100° C. Such stirring can be performed at, for example, a number of rotations of a stirring machine, of about 50 to 16000 rpm.

Emulsion polymerization or suspension polymerization can also be used in production of each resin, and the aqueous dispersion can be obtained at the same time as the production of each resin in this case.

In the production method (1), a container (preferably, a closed and/or pressure resistant container) provided with a heating apparatus capable of heating and a stirring machine capable of providing a shear force, or the like for a content is used for the reactor.

In the production method (2), examples of the kneading machine include a roll mill, a kneader, an extruder, an ink roll, and a Bunbury mixer. In particular, an extruder or a multiaxial extruder having one or more screws in a casing may be used.

In the emulsification method using an extruder, a resin to be emulsified and an emulsifier are mixed, the mixture is continuously fed through a hopper or a feed port of the extruder, and heated and melt-kneaded, water is further added thereto through at least one feed port provided in a compression zone, a metering zone, a degassing zone, and the like of the extruder, and the resultant is kneaded by a screw and then continuously extruded from a die.

The water for use in the production method is, for example, tap water or ion-exchange water. The water content in the aqueous dispersion is 30 to 97 mass %, preferably 35 to 95 mass %, more preferably 40 to 93 mass %, and further preferably 45 to 90 mass % relative to the total amount of the aqueous dispersion.

Examples of the solvent other than water include aromatic hydrocarbons such as toluene and xylene, aliphatic hydrocarbons such as hexane, octane, and decane, alicyclic aliphatic hydrocarbons such as cyclohexane and methylcyclohexane, halogenated hydrocarbons such as methylene chloride, carbon tetrachloride, and chlorobenzene, esters such as methyl acetate, ethyl acetate, propyl acetate, and butyl acetate, ketones such as acetone, methyl ethyl ketone, methyl propyl ketone, methyl isobutyl ketone, and cyclohexanone, alcohols such as methanol, ethanol, n-propanol, isopropanol, n-butanol, 2-butanol, isobutanol, t-butanol, cyclohexanol, ethylene glycol, propylene glycol, and butane diol, ethers such as dipropyl ether, dibutyl ether, and tetrahydrofuran, organic solvents having two or more functional groups, such as 2-methoxyethanol, 2-ethoxyethanol, 2-butoxyethanol, 2-methoxypropanol, 2-ethoxypropanol, and diacetone alcohol, and polar solvents such as dimethylformamide and dimethylsulfoxide.

Among them, the solvent other than water is preferably a solvent to be dissolved in water at a solubility of 1 mass % or more, more preferably a solvent to be dissolved in water at a solubility of 5 mass % or more, specifically preferably, for example, methyl ethyl ketone, methyl propyl ketone, cyclohexanone, n-propanol, isopropanol, n-butanol, 2-butanol, isobutanol, t-butanol, cyclohexanol, tetrahydrofuran, 2-methoxyethanol, 2-ethoxyethanol, 2-butoxyethanol, 2-methoxypropanol, 2-ethoxypropanol, or diacetone alcohol.

The rate of the solvent other than water to water in the aqueous dispersion is preferably 50 mass % or less, more preferably 20 mass % or less, further preferably 10 mass % or less, still further preferably 1 mass % or less, and particularly preferably 0 mass %.

The volume-based average particle size of the dispersoid in the aqueous dispersion is preferably 2 μm or less, more preferably 1.0 μm or less, further preferably 0.5 μm or less. The lower limit of the average particle size of the dispersoid in the aqueous dispersion is not particularly limited, and is, for example, 0.001 μm or more or 0.01 μm or more. When the average particle size is 2 μm or less, the aqueous dispersion is favorable in stability and also favorable in coatability of the substrate. The volume-based average particle size of the dispersoid is a particle size where the value in the cumulative particle size distribution corresponds to 50%, and is measured by, for example, a particle size distribution measurement apparatus.

The proportion of a dispersoid having a particle size of 2 μm or more in the total dispersoid in the aqueous dispersion (the proportion of a particle size of 2 μm or more in the cumulative particle size distribution on a volume basis) is preferably 5% or less, more preferably 3% or less, further preferably 1% or less. When the proportion is 5% or less, the aqueous dispersion is favorable in stability and also favorable in coatability of the substrate.

In the course of production of the aqueous dispersion, not only the resins (the component (A) and the component (B)), and water and the solvent other than water, but also optional component(s) such as an additional resin (a resin other than the component (A) and the component (B)), an emulsifier, a thickener, a dispersant, a curing agent, a pigment, a viscosity modifier, a defoamer, and an additional solvent can be added in proper amount(s) at any point of time. Such component(s) can also be added after the component (A) and the component (B) are mixed.

Examples of such an additional resin include various resins including a polyolefin-based resin different from the component (A) and the component (B), an acrylic resin (PMMA), polymers and copolymers such as polyvinyl chloride (PVC), polyvinylidene chloride, polystyrene (PS), polyvinyl acetate (PVAc), polytetrafluoroethylene (PTFE), an acrylonitrile butadiene/styrene resin (ABS resin), and an AS resin, and modified products thereof. These are used singly or as a mixture of two or more kinds thereof.

As the additional resin, a pressure-sensitive adhesive resin or a resin exerting a function as a tackifier may also be used. Examples of such a resin include rosins, a terpene-based resin, a petroleum-based resin obtained by polymerization of a petroleum fraction having 5 carbon atoms and a hydrogenated resin thereof, a petroleum-based resin obtained by polymerization of a petroleum fraction having 9 carbon atoms and a hydrogenated resin thereof, other petroleum-based resin, a coumarone resin and an indene resin, and a polyurethane-based resin.

Specific examples include rosins such as rosin, polymerized rosin, disproportionated rosin, hydrogenated rosin, maleated rosin, fumarated rosin and glycerin esters thereof, pentaerythritol ester, methyl ester, triethylene glycol ester, a phenol-modified product and an esterified product thereof; terpene-based resins such as a terpene polymer, terpene phenol, a β-pinene polymer, an aromatic modified terpene polymer, an α-pinene polymer, and a terpene-based hydrogenated resin; a petroleum-based resin obtained by polymerization of a petroleum fraction having 5 carbon atoms, a petroleum-based resin obtained by polymerization of a petroleum fraction having 9 carbon atoms, and hydrogenated resins thereof; and petroleum-based resins such as a maleic acid-modified product and a fumaric acid-modified product.

The aqueous dispersion may contain or may not substantially contain, as the emulsifier, an emulsifier such as a nonionic emulsifier, an anionic emulsifier, a cationic emulsifier, or amphoteric emulsifier, and can suitably maintain dispersibility even if not substantially containing an emulsifier. The phrase "not substantially containing an emulsifier" means that the content of the emulsifier is less than an effective amount necessary for imparting an emulsification effect to the aqueous dispersion. Specifically, the content of the emulsifier may be less than 20 mass %, less than 15 mass %, or less than 10 mass %, or may be 0 mass %, based on the total amount of the component (A) and the component (B). The emulsifier may be used singly or in combination of two or more kinds thereof.

Examples of the anionic emulsifier include a sulfuric acid ester salt of higher alcohol, a higher alkylsulfonic acid salt, a higher carboxylic acid salt, an alkylbenzenesulfonic acid salt, a polyoxyethylene alkyl sulfate salt, a polyoxyethylene alkyl phenyl ether sulfate salt, and vinyl sulfosuccinate.

Examples of the cationic emulsifier include alkylammonium salts such as a dodecyltrimethylammonium salt and a cetyltrimethylammonium salt, alkylpyridium salts such as a cetylpyridium salt and a decylpyridium salt, an oxyalkylenetrialkylammonium salt, a dioxyalkylenedialkylammonium salt, an allyltrialkylammonium salt, and a diallyldialkylammonium salt.

Examples of the nonionic emulsifier include polyoxyethylene alkyl ethers such as polyoxyethylene propylene ether, compounds having a polyoxyethylene structure, such as polyoxyethylene alkyl phenyl ethers, polyethylene glycol fatty acid esters, an ethylene oxide-propylene oxide block copolymer, polyoxyethylene fatty acid amides, and an ethylene oxide-propylene oxide copolymer, and sorbitan derivatives such as polyoxyethylene sorbitan fatty acid esters.

Examples of the amphoteric emulsifier include lauryl betaine and lauryl dimethylamine oxide.

The thickener is used for adjusting viscous properties of the aqueous dispersion. Examples of the thickener include ADEKA NOL UH-140S, UH-420, UH-438, UH-450VF, UH-462, UH-472, UH-526, UH-530, UH-540, UH-541VF, UH-550, UH-752, and H-756VF manufactured by ADEKA CORPORATION; and SN Thickener 920, 922, 924, 926, 929-S, A-801, A-806, A-812, A-813, A-818, 621N, 636, 601, 603, 612, 613, 615, 618, 621N, 630, 634, 636, and 4050 manufactured by SAN NOPCO LIMITED.

The dispersant is used for improving wettability to the substrate to be coated. Examples of the dispersant include ADEKA COL W-193, W-287, W-288, and W-304 manufactured by ADEKA CORPORATION; BYK-333, BYK-345, BYK-346, BYK-347, BYK-348, BYK-349, and BYK-378 manufactured by BYK; and NOPCO WET 50, SN WET 366, NOPCO 38-C, and SN-DISPERSANT 5468, 5034, 5027, 5040 and 5020 manufactured by SAN NOPCO LIMITED.

As the curing agent, isocyanate-based and/or carbodiimide-based curing agent are/is used, and examples include isocyanate-based curing agents such as diphenylmethane diisocyanate (MDI), tolylene diisocyanate (TDI), hexamethylene diisocyanate (HDI) and xylene diisocyanate (XDI), and oligomers or polymers thereof. Specific examples include SUMIDUR 44V20, SUMIDUR N3200, N3300, N3400, N3600, N3900, S-304, S-305, XP-2655, XP-2487, and XP-2547 manufactured by Sumika Bayer Urethane Co., Ltd. Examples of the carbodiimide-based curing agent include Carbodilite series (manufactured by Nisshinbo Chemical Inc.).

The content of the curing agent is preferably 0.1 to 20 parts by mass, and more preferably 0.1 to 10 parts by mass relative to 100 parts by mass of the total of the component (A) and the component (B). The curing agent may also be dissolved in an organic solvent and then added.

Examples of the pigment include color pigments including inorganic pigments such as titanium oxide, carbon black, iron oxide, chromium oxide, iron blue, colcothar, chrome yellow, and yellow iron oxide, and organic pigments such as an azo-based pigment, an anthracene-based pigment, a perinone-based pigment, a perylene-based pigment, a quinacridone-based pigment, an isoindolinone-based pigment, an indigo-based pigment, and a phthalocyanine-based pigment; body pigments such as talc, calcium carbonate, clay, kaolin, silica, and precipitated barium sulfate; electrically conductive pigments such as electrically conductive carbon, and a whisker coated with tin oxide doped with antimony; and non-colored or colored metallic photo-luminescent materials such as metals such as aluminum, copper, zinc, nickel, tin, and aluminum oxide, or alloys thereof. Such pigments are used singly or in combinations of two or more kinds thereof.

In the case where the pigment is used, a pigment dispersant may be used in combination. Examples of the pigment dispersant include an aqueous acrylic resin such as Joncryl manufactured by BASF SE; an acidic block copolymer such as BYK-190 manufactured by BYK; a styrene-maleic acid copolymer; an acetylene diol derivative such as Surfynol T324 manufactured by Air Products and Chemicals, Inc.; and water-soluble carboxy methyl acetate butyrate such as CMCAB-641-0.5 manufactured by Eastman Chemical Company. Such pigment dispersants can be used to thereby prepare a pigment paste where dispersing of the pigment is stabilized.

The viscosity modifier is added for properly adjusting the viscosity of the aqueous dispersion, and is used as long as performances of the aqueous dispersion of the present invention are not remarkably deteriorated. Examples of the viscosity modifier include, but are not particularly limited, BYK-420 and BYK-425 (manufactured by BYK).

The aqueous dispersion may further comprise, if necessary, optional component(s), for example, a stabilizer such as a phenol-based stabilizer, a phosphite-based stabilizer, an amine-based stabilizer, an amide-based stabilizer, an anti-aging agent, a weathering stabilizer, an anti-settling agent, an antioxidant, a heat stabilizer, or a light stabilizer; an additive such as a thixotropic agent, a thickener, a dispersant, a defoamer, a weather resistant agent, an antistatic agent, a lubricant, a nucleating agent, a flame retardant, an oil, a dye, a curing agent, or a crosslinking agent; and an inorganic or organic filler such as a glass fiber, a carbon fiber, a potassium titanate fiber, wollastonite, calcium carbonate, calcium sulfate, talc, a glass flake, barium sulfate, clay, kaolin, fine powder silica, mica, calcium silicate, aluminum hydroxide, magnesium hydroxide, aluminum oxide, magnesium oxide, alumina, or celite, as long as desired properties are not impaired.

The aqueous dispersion according to the present embodiment has excellent close adhesiveness to polyolefins such as polyethylene (polyolefin mainly having a structural unit derived from ethylene), polypropylene (polyolefin mainly having a structural unit derived from propylene) and polystyrene (polyolefin mainly having a structural unit derived from styrene), and therefore is suitably used for a substrate made of such polyolefin.

The aqueous dispersion according to the present embodiment also has excellent close adhesiveness to a substrate other than the substrate made of polyolefin. Examples of such other substrate include substrates widely generally used, the substrates being formed of an acrylic urethane resin, a polyamide resin, an unsaturated polyester resin, a polybutylene terephthalate resin, a polycarbonate resin, a vinyl chloride resin, a polyester resin, a polyurethane resin, an epoxy resin, paper, synthetic paper, woods, a woven cloth, a knitted cloth, a non-woven cloth, a metal component (including iron, aluminum, copper, nickel, silver, gold, platinum, and various alloys), woods (including pulp and a paper material), and a stone material. The aqueous dispersion has excellent close adhesiveness to such a substrate having a polar surface, and therefore is suitably used for such a substrate having a polar surface.

Thus, the aqueous dispersion according to the present embodiment is excellent in both close adhesiveness to a substrate having a non-polar surface, like the substrate made of polyolefin, and close adhesiveness to the substrate having a polar surface, and therefore is suitable as, for example, an adhesive for allowing the substrate made of polyolefin (substrate having a non-polar surface) and the substrate having a polar surface to adhere to each other. In other words, the aqueous dispersion exhibits excellent adhesiveness even in the case of allowing substrates made of the same material as each other to adhere to each other and even in the case of allowing substrates made of different materials from each other to adhere to each other. The aqueous dispersion is particularly suitable for allowing a polyurethane resin film and a polyolefin resin film to adhere to each other, allowing a polyurethane resin film and a polyester resin film to adhere to each other, allowing a polyurethane resin film and a metal to be laminated, and the like. Accordingly, the aqueous dispersion according to the present embodiment is useful for various applications, and, for example, can be used as an aqueous adhesive or a primer composition as it is, or can be used together with other component(s) in an aqueous coating material composition, an aqueous adhesive, or a primer composition.

Examples of such other component(s) include an aqueous dispersion of an epoxy resin, an aqueous dispersion of polyester, an aqueous dispersion (acrylic dispersion) of an acrylic resin, and an aqueous dispersion (polyurethane dispersion) of a urethane resin.

In the case of the aqueous coating material composition, the substrate can be coated with the aqueous coating material composition at, for example, 40° C. to 160° C. preferably 60° C. to 130° C., and more preferably 80° C. to 110° C., for, for example, 1 minute to 1 hour, and preferably 3 to 30 minutes, thereby forming a coating film on the substrate.

In the case of the primer composition, a coating film of the primer composition can be formed by, if necessary, drying and curing at a temperature ranging from room temperature (for example, 25° C.) to 100° C., and thereafter the coating film can be coated with other coating material, and heated at a temperature, for example, ranging from 40° C. to 160° C., preferably 60° C. to 130° C., more preferably 80° C. to 110° C., for, for example, 1 minute to 1 hour, preferably 3 minutes to 30 minutes, thereby forming a coating film of such a coating material. Examples of the coating material include a color-based coating material and a clear coating material. These may be aqueous or may be based on an organic solvent, and may comprise various resins such as an olefin-based polymer, or various pigments.

In the case of the aqueous adhesive, one or both surfaces of the substrate can be coated with the aqueous adhesive, the resultant can be, if necessary, dried and cured at a temperature ranging from room temperature (for example, 25° C.) to 100° C., and thereafter two of the substrates can be bonded and treated at an appropriate temperature, thereby allowing the substrates to adhere to each other.

The shape of the substrate is not particularly limited, and may be a film, sheet, plate-like shape, or the like and may be in the form of a molded article obtained by a known molding method such as injection molding, compression molding, hollow molding, extrusion molding, or rotational molding. The substrate may be formed of a resin composition containing the resin, and an inorganic filler component, a pigment, or the like. Examples of the inorganic filler component and the pigment include plate-like fillers such as talc, mica, and montmorillonite; fibrous fillers such as a short glass fiber, a long glass fiber, a carbon fiber, an aramid fiber, an alumina fiber, a boron fiber, and Xonotlite; needle-like (whiskers) fillers such as potassium titanate, magnesium oxysulfate, silicon nitride, aluminum borate, basic magnesium sulfate, zinc oxide, Wollastonite, calcium carbonate, and silicon carbide; particulate fillers such as precipitated calcium carbonate, heavy calcium carbonate, and magnesium carbonate; balloon-like fillers such as a glass balloon; and inorganic fillers and pigments such as zinc flower, titanium white, and magnesium sulfate.

Any known method can be used as the method for coating the substrate with an aqueous dispersion mixture, without any particular limitation, and examples include an air spray method, an airless spray method, gravure roll coating, reverse roll coating, wire bar coating, lip coating, air knife coating, curtain flow coating, spray coating, dip coating, and a brush coating method.

The drying, curing, and heating can be conducted by using, for example, a method and an apparatus conventionally used, for example, with nichrome wire, infrared light, radio frequency radiation, or the like.

As described above, the coating film according to the present embodiment is a coating film formed from the above-mentioned aqueous dispersion. The coating film according to the present embodiment contains the following component (A), the component (B) and the component (C).

Component (A): a highly modified polyolefin of a polyolefin (a) having a structural unit derived from ethylene and a structural unit derived from propylene and having a melting peak observed by differential scanning calorimetric analysis, by an $\alpha,\beta$-unsaturated carboxylic acid compound Component (B): a polyolefin (B-1) having a structural unit derived from at least one olefin selected from the group consisting of ethylene and $\alpha$-olefins having 3 to 20 carbon atoms, and/or a lowly modified polyolefin (B-2) of the polyolefin (B-1) by an $\alpha,\beta$-unsaturated carboxylic acid compound Component (C): a basic compound Preferable aspects of the component (A), the component (B), and the component (C) in the coating film, any components which can be contained, other than such components, and the like are the same as those described with respect to the aqueous dispersion.

The thickness of the coating film formed is appropriately selected depending on the material and shape of the substrate, the composition of the coating material used, and the like, and is, for example, 0.1 μm to 500 μm, preferably 1 μm to 300 μm, and more preferably 3 μm to 200 μm.

A laminate according to one embodiment comprises a substrate having a non-polar surface, and the coating film laminated on the non-polar surface of the substrate. The laminate may further comprise a substrate having a polar surface, laminated on a surface of the coating film, the surface being opposite to the substrate having a non-polar surface, according to another embodiment. That is, a laminate according to another embodiment is a laminate formed by laminating a substrate having a non-polar surface, the coating film, and a substrate having a polar surface in this order.

A coating film, a laminate and a coating article using the aqueous dispersion according to the present embodiment have excellent water resistance and moisture resistance, and therefore can be used in various industrial components such as automobiles, home electronics, and building materials, and have sufficient performances for practical use in, particularly, parts and materials thinner in thickness, higher in function, and larger in size. The coating film, the laminate, and the coating article can be used in, for example, molding materials for various industrial components including automobile parts such as bumpers, instrument panels, trim, and garnishes, home electronics parts such as television cases, washing machine tubs, parts for refrigerators, parts for air conditioners, and parts for vacuum cleaners, toilet items such as toilet seats, toilet seat lids, and water tanks, and bathroom items such as bathtubs, bathroom walls, ceilings, and water drain pans.

EXAMPLES

Hereinafter, the present invention will be further specifically described based on Examples, but the present invention is not intended to be limited to the following Examples.

(1) Quantitative Determining of Structural Unit Derived from α,β-Unsaturated Carboxylic Acid Compound Chemically Bound to Polyolefin Resin (Hereinafter, Also Referred to as "Modified Functional Unit")

The amount of a modified functional unit in a graft modified polyolefin was determined by repeating a washing step of dissolving 1.0 g of a sample in 20 ml of xylene, dropping the sample solution to 300 ml of methanol with stirring to re-precipitate and recover the sample, and then drying the recovered sample in vacuum, in order to remove an α,β-unsaturated carboxylic acid compound not bound to a polyolefin resin, three times, thereafter molding the resulting sample into a film having a thickness of 100 μm by heat-pressing, and measuring an infrared absorption spectrum of the resulting film. The amount (mass %) of the modified functional unit relative to 100 parts by mass of the graft modified polyolefin was calculated using a calibration curve created by subjecting a resin, where the amount modified was known, to measurement according to the above method. For example, in the case where the amount of maleic anhydride was quantitatively determined, the amount was quantitatively determined based on the absorption around 1780 $cm^{-1}$.

The amount of a graft modified polyolefin which was based on an α,β-unsaturated carboxylic acid compound other than maleic anhydride and which could not be measured with respect to its infrared absorption spectrum was quantitatively determined as the amount of a structural unit derived from an α,β-unsaturated carboxylic acid compound, measured by 1H-NMR.

(2) Melting Point and Crystal Melting Heat Quantity

Measurement was conducted under the following conditions by use of a differential scanning calorimeter (EXSTAR 6000 manufactured by Seiko Instruments Inc. (SII)).

(i) About 5 mg of a specimen was heated from room temperature to 200° C. at a temperature rise rate of 30° C./min, and the temperature was kept for 5 minutes after completion of the temperature rise.

(ii) Next, the temperature was dropped from 200° C. to −100° C. at a temperature drop rate of 10° C./min, and was kept for 5 minutes after completion of the temperature drop.

(iii) Next, the temperature was raised from −100° C. to 200° C. at a temperature rise rate of 10° C./min. The temperature where a melting peak of a crystal was observed was here defined as the melting point. With respect to the peak area, the presence of a melting peak where the crystal melting heat quantity was 1 J/g or more was confirmed.

(3) Weight Average Molecular Weight Mw

Measurement was conducted by a gel permeation chromatograph (GPC) method under the following conditions.
Apparatus: HLC-8121 GPC/HT manufactured by Tosoh Corporation
Column: TSKgel GMHHR-H(S)HT, four columns, manufactured by Tosoh Corporation
Temperature: 145° C.
Solvent: o-dichlorobenzene
Flow rate of elution solvent: 1.0 ml/min
Specimen concentration: 1 mg/ml
Amount of injection for measurement: 300 μl
Molecular weight standard substance: standard polystyrene
Detector: differential reflection
The weight average molecular weight (Mw) and the number average molecular weight (Mn) were calculated by subjecting a commercially available monodispersed polystyrene standard specimen as a standard specimen to measurement, and creating a calibration curve from the retention time and the molecular weight of the standard specimen.

(4) Particle Size

The average particle size of a dispersoid was measured by using a concentrated system particle size analyzer FPAR-1000 manufactured by Otsuka Electronics Co., Ltd., for observation of scattering light from a particle with dynamic light scattering.

Production of Graft Modified Polyolefin

Production Example 1

A 3000-ml separable flask equipped with a stirrer, a thermometer, a reflux condenser, and a nitrogen gas introduction tube was charged with 100 g of polyolefin (a-1) [ethylene/propylene copolymer (ethylene:propylene=15 mol %:85 mol %, Mw=55000, melting point=70° C., a crystal melting peak having a crystal melting heat quantity of 1 J/g or more (hereinafter, "melting peak") was observed)] and 15 g of propylene glycol-1-monomethyl ether-2-acetate, melting was conducted under a nitrogen atmosphere in an oil bath kept at 170° C., and the temperature of the oil bath was adjusted with stirring so that the temperature of the system was 170° C. After the system was molten, 17 g of dodecyl methacrylate and 7 g of maleic anhydride were added with a uniform state being provided with stirring, and thereafter 2 g of Perbutyl D was added. After the reaction was conducted for 5 hours with the temperature in the system being kept at 170° C., low molecular weight volatile substances such as propylene glycol-1-monomethyl ether-2- acetate, an unreacted dodecyl methacrylate, and maleic anhydride were removed with the pressure in the flask being reduced by an aspirator. After completion of the pressure reduction, the reaction product was taken out and cooled to thereby provide a solid product of highly modified polyolefin (A-1). The Mw was 63500, the melting point was 71° C., the amount of the structural unit derived from maleic anhydride chemically bound to polyolefin (a-1) was 3.1 mass %, and the amount of the structural unit derived from dodecyl methacrylate chemically bound to polyolefin (a-1) was 8.7 mass %. Herein, when the quantitative determining was conducted without any washing step conducted in the operation for quantitatively determining the amounts of the modified functional units, the amount of maleic anhydride was 3.9 mass % and the amount of dodecyl methacrylate was 14.4 mass %.

Production Example 2

A 3000-ml separable flask equipped with a stirrer, a thermometer, a reflux condenser, and a nitrogen gas introduction tube is charged with 100 g of polyolefin (a-1) [ethylene/propylene copolymer (ethylene:propylene=15 mol %:85 mol %, Mw=55000, melting point=70° C., a melting peak was observed)] and 15 g of propylene glycol-1-monomethyl ether-2-acetate, melting is conducted under a nitrogen atmosphere in an oil bath kept at 170° C., and the temperature of the oil bath is adjusted with stirring so that the temperature of the system is 170° C. After the system was molten, 10 g of maleic anhydride is added with a uniform state being provided with stirring, and thereafter 2 g of Perbutyl D is added. After the reaction is conducted for 5 hours with the temperature in the system being kept at 170° C., low molecular weight volatile substances such as propylene glycol-1-monomethyl ether-2-acetate, and an unreacted maleic anhydride are removed with the pressure in the flask being reduced by an aspirator. After completion of the pressure reduction, the reaction product is taken out and cooled to thereby provide a solid product of highly modified polyolefin (A-2).

Production Example 3

A 3000-ml separable flask equipped with a stirrer, a thermometer, a reflux condenser, and a nitrogen gas introduction tube was charged with 100 g of polyolefin (a-1) [ethylene/propylene copolymer (ethylene:propylene=15 mol %:85 mol %, Mw=55000, melting point=70° C., a melting peak was observed)] and 15 g of propylene glycol-1-monomethyl ether-2-acetate, melting was conducted under a nitrogen atmosphere in an oil bath kept at 170° C., and the temperature of the oil bath was adjusted with stirring so that the temperature of the system was 170° C. After the system was molten, 13 g of 2-ethylhexyl acrylate and 6.5 g of maleic anhydride were added with a uniform state being provided with stirring, and thereafter 2 g of Perbutyl D was added. After the reaction was conducted for 5 hours with the temperature in the system being kept at 170° C., low molecular weight volatile substances such as propylene glycol-1-monomethyl ether-2-acetate, an unreacted 2-ethylhexyl acrylate, and maleic anhydride were removed with the pressure in the flask being reduced by an aspirator. After completion of the pressure reduction, the reaction product was taken out and cooled to thereby provide a solid product of highly modified polyolefin (A-3). The Mw was 63000, the melting point was 71° C., the amount of the structural unit derived from maleic anhydride chemically bound to polyolefin (a-1) was 2.1 mass %, and the amount of the structural unit derived from 2-ethylhexyl acrylate chemically bound to polyolefin (a-1) was 7.0 mass %. Herein, when the quantitative determining was conducted without any washing step conducted in the operation for quantitatively determining the amounts of the modified functional units, the amount of maleic anhydride was 4.5 mass % and the amount of 2-ethylhexyl acrylate was 10.9 mass %.

Production Example 4

A 3000-ml separable flask equipped with a stirrer, a thermometer, a reflux condenser, and a nitrogen gas introduction tube was charged with 100 g of polyolefin (a-1) [ethylene/propylene copolymer (ethylene:propylene=15 mol %:85 mol %, Mw=55000, melting point=70° C., a melting peak was observed)] and 15 g of propylene glycol-1-monomethyl ether-2-acetate, melting was conducted under a nitrogen atmosphere in an oil bath kept at 170° C., and the temperature of the oil bath was adjusted with stirring so that the temperature of the system was 170° C. After the system was molten, 12 g of dodecyl methacrylate and 5 g of maleic anhydride were added with a uniform state being provided with stirring, and thereafter 2 g of Perbutyl D was added. After the reaction was conducted for 5 hours with the temperature in the system being kept at 170° C., low molecular weight volatile substances such as propylene glycol-1-monomethyl ether-2-acetate, an unreacted dodecyl methacrylate, and maleic anhydride were removed with the pressure in the flask being reduced by an aspirator. After completion of the pressure reduction, the reaction product was taken out and cooled to thereby provide a solid product of highly modified polyolefin (A-4). The Mw was 64900, the melting point was 71° C., the amount of the structural unit derived from maleic anhydride chemically bound to polyolefin (a-1) was 2.5 mass %, and the amount of the structural unit derived from dodecyl methacrylate chemically bound to polyolefin (a-1) was 6.9 mass %. Herein, when the quantitative determining was conducted without any washing step conducted in the operation for quantitatively determining the amounts of the modified functional units, the amount of maleic anhydride was 3.6 mass % and the amount of dodecyl methacrylate was 11.8 mass %.

Production Example 5

A 3000-ml separable flask equipped with a stirrer, a thermometer, a reflux condenser, and a nitrogen gas introduction tube was charged with 100 g of polyolefin (a-2) [ethylene/propylene copolymer (ethylene:propylene=15 mol %:85 mol %, Mw=6400, melting point=73° C., a melting peak was observed)] and 15 g of propylene glycol-1-monomethyl ether-2-acetate, melting was conducted under a nitrogen atmosphere in an oil bath kept at 170° C., and the temperature of the oil bath was adjusted with stirring so that the temperature of the system was 170° C. After the system was molten, 10 g of dodecyl methacrylate and 5 g of maleic anhydride were added with a uniform state being provided with stirring, and thereafter 2 g of Perbutyl D was added. After the reaction was conducted for 5 hours with the temperature in the system being kept at 170° C., low molecular weight volatile substances such as propylene glycol-1-monomethyl ether-2-acetate, an unreacted dodecyl methacrylate, and maleic anhydride were removed with the pressure in the flask being reduced by an aspirator. After completion of the pressure reduction, the reaction product was taken out and cooled to thereby provide a solid product of highly modified polyolefin (A-5). The Mw was 18800, the melting point was 73° C., the amount of the structural unit derived from maleic anhydride chemically bound to polyolefin (a-2) was 2.4 mass %, and the amount of the structural unit derived from dodecyl methacrylate chemically bound to polyolefin (a-2) was 6.1 mass %. Herein, when the quantitative determining was conducted without any washing step conducted in the operation for quantitatively determining the amounts of the modified functional units, the amount of maleic anhydride was 3.7 mass % and the amount of dodecyl methacrylate was 10.1 mass %.

Production Example 6

A 3000-ml separable flask equipped with a stirrer, a thermometer, a reflux condenser, and a nitrogen gas introduction tube was charged with 100 g of polyolefin (B-1-1) [propylene/1-butene copolymer (propylene:1-butene=96 mol %:4 mol %, Mw=440000, no melting peak was observed)] and 15 g of propylene glycol-1-monomethyl ether-2-acetate, melting was conducted under a nitrogen atmosphere in an oil bath kept at 170° C., and the temperature of the oil bath was adjusted with stirring so that the temperature of the system was 170° C. After the system was molten, 20 g of dodecyl methacrylate and 10 g of maleic anhydride were added with a uniform state being provided with stirring, and thereafter 2 g of Perbutyl D was added. After the reaction was conducted for 5 hours with the temperature in the system being kept at 170° C., low molecular weight volatile substances such as propylene glycol-1-monomethyl ether-2-acetate, an unreacted dodecyl methacrylate, and maleic anhydride were removed with the pressure in the flask being reduced by an aspirator. After completion of the pressure reduction, the reaction product was taken out and cooled to thereby provide a solid product of highly modified polyolefin (X-1). The Mw was 151500, the amount of the structural unit derived from maleic anhydride chemically bound to polyolefin (B-1-1) was 1.0 mass %, and the amount of the structural unit derived from dodecyl methacrylate chemically bound to polyolefin (B-1-1) was 4.3 mass %. Herein, when the quantitative determining was conducted without any washing step conducted in the operation for quantitatively determining the amounts of the modified functional units, the amount of maleic anhydride was 4.3 mass % and the amount of dodecyl methacrylate was 15.2 mass %.

Production Example 7

A 3000-ml separable flask equipped with a stirrer, a thermometer, a reflux condenser, and a nitrogen gas introduction tube was charged with 100 g of polyolefin (a-2) [ethylene/propylene copolymer (ethylene:propylene=15 mol %:85 mol %, Mw=6400, melting point=73° C., a melting peak was observed)] and 15 g of propylene glycol-1-monomethyl ether-2-acetate, melting was conducted under a nitrogen atmosphere in an oil bath kept at 170° C., and the temperature of the oil bath was adjusted with stirring so that the temperature of the system was 170° C. After the system was molten, 0.75 g of 2-ethylhexyl acrylate and 0.4 g of maleic anhydride were added with a uniform state being provided with stirring, and thereafter 2 g of Perbutyl D was added. After the reaction was conducted for 5 hours with the temperature in the system being kept at 170° C., low molecular weight volatile substances such as propylene glycol-1l-monomethyl ether-2-acetate, an unreacted 2-ethylhexyl acrylate, and maleic anhydride were removed with the pressure in the flask being reduced by an aspirator. After completion of the pressure reduction, the reaction product was taken out and cooled to thereby provide a solid product of lowly modified polyolefin (B-2-1). The Mw was 16500, the melting point was 73° C., the amount of the structural unit derived from maleic anhydride chemically bound to polyolefin (a-2) was 0.2 mass %, and the amount of the structural unit derived from 2-ethylhexyl acrylate chemically bound to polyolefin (a-2) was 0.4 mass %. Herein, when the quantitative determining was conducted without any washing step conducted in the operation for quantitatively determining the amounts of the modified functional units, the amount of maleic anhydride was 0.2 mass % and the amount of 2-ethylhexyl acrylate was 0.5 mass %.

Preparation of Aqueous Dispersion

Example 1

A separable flask was charged with 85 g of highly modified polyolefin (A-1) and 15 g of polyolefin (B-1-2) [polypropylene (propylene=100 mol %, Mw=46000, melting point=51° C., a melting peak was observed)], the content therein was molten in an oil bath kept at 100° C., thereafter, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-1). The non-volatile content was about 34%, the volume-based average particle size of the dispersoid in (D-1) was 0.08 μm, and the proportion of a dispersoid having a particle size of 2 μm or more in the total dispersoid was 0%.

Example 2

A separable flask was charged with 85 g of highly modified polyolefin (A-3) and 15 g of polyolefin (a-2) [ethylene/propylene copolymer (ethylene:propylene=15 mol %:85 mol %, Mw=6400, melting point=73° C., a melting peak was observed)], the content therein was molten in an oil bath kept at 100° C., thereafter, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-2). The non-volatile content was about 37%, the volume-based average particle size of the dispersoid in (D-2) was 0.08 μm, and the proportion of a dispersoid having a particle size of 2 μm or more in the total dispersoid was 0%.

Example 3

A separable flask was charged with 85 g of highly modified polyolefin (A-1) and 15 g of polyolefin (B-1-1) [propylene/1-butene copolymer (propylene:1-butene=96 mol %:4 mol %, Mw=440000, no melting peak was observed)], the content therein was molten in an oil bath kept at 100° C., thereafter, 50 g of toluene, and 10 g of dimethylaminoethanol were added thereto, and the resultant was stirred and mixed. After the melting and mixing, 2-butanol and ion-exchange water at 80° C. were added in small portions with vigorous stirring. The content was taken out after addition of 40 g of 2-butanol and 200 g of ion-exchange water, and any volatile component other than ion-exchange water was removed using an evaporator, thereby providing aqueous dispersion (D-3). The non-volatile content was about 35%, the volume-based average particle size of the dispersoid in (D-3) was 0.8 μm, and the proportion of a dispersoid having a particle size of 2 μm or more in the total dispersoid was 0%.

Example 4

A separable flask was charged with 85 of highly modified polyolefin (A-1) and 15 g of polyolefin (B-1-3) [ethylene/propylene/1-butene copolymer (ethylene:propylene:1-butene=54 mol %:8 mol %:38 mol %, Mw=270000, no melting peak was observed)], the content therein was molten in an oil bath kept at 100° C., thereafter, 50 g of toluene, and 10 g of dimethylaminoethanol were added thereto, and the resultant was stirred and mixed. After the melting and mixing, 2-butanol and ion-exchange water at 80° C. were added in small portions with vigorous stirring. The content was taken out after addition of 40 g of 2-butanol and 200 g of ion-exchange water, and any volatile component other than ion-exchange water was removed using an evaporator, thereby providing aqueous dispersion (D-4). The non-volatile content was about 32%, the volume-based average particle size of the dispersoid in (D-4) was 0.2 μm, and the proportion of a dispersoid having a particle size of 2 μm or more in the total dispersoid was 0%.

Example 5

A separable flask was charged with 85 g of highly modified polyolefin (A-3) and 15 g of polyolefin (a-1), the content therein was molten in an oil bath kept at 100° C., thereafter, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-5). The non-volatile content was about 35%, the volume-based average particle size of the dispersoid in (D-5) was 0.09 μm, and the proportion of a dispersoid having a particle size of 2 μm or more in the total dispersoid was 0%.

Example 6

A separable flask was charged with 80 g of highly modified polyolefin (A-3) and 20 g of polyolefin (a-1), the content therein was molten in an oil bath kept at 100° C., thereafter, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-6). The non-volatile content was about 38%, the volume-based average particle size of the dispersoid in (D-6) was 0.08 μm, and the proportion of a dispersoid having a particle size of 2 μm or more in the total dispersoid was 0%.

Example 7

A separable flask was charged with 75 g of highly modified polyolefin (A-3) and 25 g of polyolefin (a-1), the content therein was molten in an oil bath kept at 100° C., thereafter, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-7). The non-volatile content was about 35%, the volume-based average particle size of the dispersoid in (D-7) was 0.10 μm, and the proportion of a dispersoid having a particle size of 2 μm or more in the total dispersoid was 0%.

Example 8

A separable flask was charged with 67.5 g of highly modified polyolefin (A-3) and 32.5 g of polyolefin (a-1), the content therein was molten in an oil bath kept at 100° C., thereafter, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-8). The non-volatile content was about 37%, the volume-based average particle size of the dispersoid in (D-8) was 0.11 μm, and the proportion of a dispersoid having a particle size of 2 μm or more in the total dispersoid was 0%.

Example 9

A separable flask was charged with 85 g of highly modified polyolefin (A-3), 7.5 g of polyolefin (B-1-2) [polypropylene (propylene=100 mol %, Mw 46000, melting point=51° C., a melting peak was observed)], and 7.5 g of polyolefin (a-1), the content therein was molten in an oil bath kept at 100° C. thereafter, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-9). The non-volatile content was about 39%, the volume-based average particle size of the dispersoid in (D-9) was 0.08 μm, and the proportion of a dispersoid having a particle size of 2 μm or more in the total dispersoid was 0%.

Example 10

A separable flask is charged with 85 g of highly modified polyolefin (A-2) and 15 g of polyolefin (B-1-1) [propylene/1-butene copolymer (propylene:1-butene=96 mol %:4 mol %, Mw=440000, no melting peak was observed)], the content therein is molten in an oil bath kept at 100° C., thereafter, 40 g of 2-butanol, and 10 g of dimethylaminoethanol are added thereto, and the resultant is stirred and mixed. After the melting and mixing, ion-exchange water at 80° C. is added in small portions with vigorous stirring. The content is taken out after addition of 200 g of ion-exchange water, and any volatile component other than ion-exchange water is removed using an evaporator, thereby providing aqueous dispersion (D-10).

Example 11

A separable flask was charged with 85 g of highly modified polyolefin (A-3) and 15 g of polyolefin (a-1), the content therein was molten in an oil bath kept at 100° C., thereafter, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-11). The non-volatile content was about 30%, the volume-based average particle size of the dispersoid in (D-11) was 0.08 μm, and the proportion of a dispersoid having a particle size of 2 μm or more in the total dispersoid was 0%.

Example 12

A separable flask was charged with 85 g of highly modified polyolefin (A-3) and 15 g of polyolefin (B-1-1) [propylene/1-butene copolymer (propylene:1-butene=96 mol %:4 mol %, Mw=440000, no melting peak was observed)], the content therein was molten in an oil bath kept at 100° C., thereafter, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-12). The non-volatile content was about 30%, the volume-based average particle size of the dispersoid in (D-12) was 0.40 μm, and the proportion of a dispersoid having a particle size of 2 μm or more in the total dispersoid was 0%.

Example 13

A separable flask was charged with 85 g of highly modified polyolefin (A-3) and 15 g of lowly modified polyolefin (B-2-1), the content therein was molten in an oil bath kept at 100° C., thereafter, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-13). The non-volatile content was about 37%, the volume-based average particle size of the dispersoid in (D-13) was 0.09 μm, and the proportion of a dispersoid having a particle size of 2 μm or more in the total dispersoid was 0%.

Example 14

A separable flask was charged with 85 g of highly modified polyolefin (A-3) and 15 g of polyolefin (B-1-2) [polypropylene (propylene=100 mol %, Mw=46000, melting point=51° C., a melting peak was observed)], the content therein was molten in an oil bath kept at 100° C., thereafter, 6 g of Latemul E-1000A (manufactured by Kao Corporation, solid content: 30 mass %), 2 g of Noigen EA-177 (manufactured by DKS Co. Ltd., solid content: 100 mass %), 150 g of toluene, and 10 g of dimethylaminoethanol were added thereto, and the resultant was stirred and mixed. After the melting and mixing, ion-exchange water at 80° C. was added in small portions with vigorous stirring. The content was taken out after addition of 250 g of ion-exchange water, and any volatile component other than ion-exchange water was removed using an evaporator, thereby providing aqueous dispersion (D-14). The non-volatile content was about 39%, the volume-based average particle size of the dispersoid in (D-14) was 0.09 μm, and the proportion of a dispersoid having a particle size of 2 μm or more in the total dispersoid was 0%.

Comparative Example 1

A separable flask was charged with 100 g of highly modified polyolefin (A-1), the content therein was molten in an oil bath kept at 100° C., thereafter, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-15). The non-volatile content was about 34%, the volume-based average particle size of the dispersoid in (D-15) was 0.07 μm, and the proportion of a dispersoid having a particle size of 2 μm or more in the total dispersoid was 0%.

Comparative Example 2

A separable flask was charged with 100 g of highly modified polyolefin (A-3), the content therein was molten in an oil bath kept at 100° C., thereafter, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-16).

The non-volatile content was about 30%, the volume-based average particle size of the dispersoid in (D-16) was 0.08 μm, and the proportion of a dispersoid having a particle size of 2 μm or more in the total dispersoid was 0%.

Comparative Example 3

A separable flask was charged with 100 g of highly modified polyolefin (A-4), the content therein was molten in an oil bath kept at 100° C., thereafter, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-17). The non-volatile content was about 35%, the volume-based average particle size of the dispersoid in (D-17) was 0.07 μm, and the proportion of a dispersoid having a particle size of 2 μm or more in the total dispersoid was 0%.

Comparative Example 4

A separable flask was charged with 85 g of highly modified polyolefin (A-1) and 15 g of highly modified polyolefin (A-5), the content therein was molten in an oil bath kept at 100° C., thereafter, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-18). The non-volatile content was about 33%, the volume-based average particle size of the dispersoid in (D-18) was 0.07 μm, and the proportion of a dispersoid having a particle size of 2 μm or more in the total dispersoid was 0%.

Comparative Example 5

A separable flask was charged with 85 g of highly modified polyolefin (A-1) and 15 g of highly modified polyolefin (X-1), the content therein was molten in an oil bath kept at 100° C., thereafter, 50 g of toluene, and 10 g of dimethylaminoethanol were added thereto, and the resultant was stirred and mixed. After the melting and mixing, 2-butanol and ion-exchange water at 80° C. were added in small portions with vigorous stirring. The content was taken out after addition of 40 g of 2-butanol and 200 g of ion-exchange, water, and any volatile component other than ion-exchange water was removed using an evaporator, thereby providing aqueous dispersion (D-19). The non-volatile content was about 34%, the volume-based average particle size of the dispersoid in (D-19) was 0.07 μm, and the proportion of a dispersoid having a particle size of 2 μm or more in the total dispersoid was 0%.

Comparative Example 6

A separable flask was charged with 30 g of highly modified polyolefin (A-3) and 70 g of polyolefin (a-1), the content therein was molten in an oil bath kept at 100° C., thereafter, 17 g of Latemul E-1000A (manufactured by Kao Corporation, solid content: 30 mass %), 5 g of Noigen EA-177 (manufactured by DKS Co. Ltd., solid content: 100 mass %), 150 g of toluene, 40 g of 2-butanol, and 10 g of dimethylaminoethanol were added thereto, and the resultant was stirred and mixed. After the melting and mixing, ion-exchange water at 80° C. was added in small portions with vigorous stirring. The content was taken out after addition of 200 g of ion-exchange water, and any volatile component other than ion-exchange water was removed using an evaporator, thereby providing aqueous dispersion (D-20). The non-volatile content was about 30%, the volume-based average particle size of the dispersoid in (D-20) was 0.31 μm, and the proportion of a dispersoid having a particle size of 2 μm or more in the total dispersoid was 0%.

Production of Test Coating Object

A polypropylene substrate (degreased) was coated with each of the aqueous dispersions prepared in Examples and Comparative Examples above by a wire bar so that the thickness after drying was about 10 μm, the resultant was heated and dried at 50° C. for 5 minutes, and thereafter further spray-coated with an acrylic urethane coating material "Polynal No. 800" (manufactured by Ohashi Chemical Industries Ltd.) so that the thickness after drying was about 100 μm, and the resultant was heated and dried at 80° C. for 30 minutes, thereby producing a test coating object.

Evaluation of Peeling Strength (Close Adhesiveness)

The test coating object was cut out to a width of 10 mm, and the peeling strength of the coating film was measured using a tensile tester (Autograph manufactured by Shimadzu Corporation) at a tension rate of 50 mm/min and a tensile angle of 180 degrees. The results are shown in Table 1 and Table 2. The peeling site was visually confirmed, and a case where peeling was confirmed between the polypropylene substrate and the coating film was designated as "PP interface" and a case where peeling was confirmed between the coating film and the acrylic urethane coating material was designated as "coating material interface" in Table 1 and Table 2.

Evaluation of Water Resistance

A polypropylene substrate (degreased) was coated with each of the aqueous dispersions prepared in Examples and Comparative Examples above by a wire bar so that the thickness after drying was about 10 μm, and the resultant was heated and dried at 50° C. for 5 minutes, and thereafter heated and dried at 80° C. for 30 minutes, thereby producing a test coating object. The test coating object was immersed in warm water at 40° C. for 10 days, and whether or not the coating film surface was whitened due to water absorption was visually confirmed. A case where the coating film surface was not whitened and was not changed in gloss before and after the immersion was rated as "A", a case where the coating film surface was not whitened and was changed in gloss before and after the immersion was rated as "B", and a case where the coating film surface was whitened or a case where swelling due to water was caused on the coating film was rated as "C". The results are shown in Table 1 and Table 2. Herein, the "Peeling strength" in Table 1 corresponds to a relative value under the assumption of the value of the peeling strength in Comparative Example 1 being defined as 100, and it can be said that a larger value is more excellent in peeling strength and a value of more than 100 is excellent in close adhesiveness. The "Peeling strength" in Table 2 corresponds to a relative value under the assumption of the value of the peeling strength in Comparative Example 2 being defined as 100, and it can be said that a larger value is more excellent in peeling strength and a value of more than 100 is excellent in close adhesiveness.

TABLE 1

| | Aqueous dispersion | Close adhesiveness | | Water resistance |
|---|---|---|---|---|
| | | Peeling strength | Peeling site | |
| Example 1 | D-1 | 107 | PP interface | A |
| Example 3 | D-3 | 132 | PP interface | A |
| Example 4 | D-4 | 123 | PP interface | A |
| Comparative Example 1 | D-15 | 100 | PP interface | A |

TABLE 1-continued

| | Aqueous dispersion | Close adhesiveness Peeling strength | Close adhesiveness Peeling site | Water resistance |
|---|---|---|---|---|
| Comparative Example 3 | D-17 | 95 | PP interface | A |
| Comparative Example 4 | D-18 | 91 | PP interface | A |
| Comparative Example 5 | D-19 | 123 | PP interface | C |

TABLE 2

| | Aqueous dispersion | Close adhesiveness Peeling strength | Close adhesiveness Peeling site | Water resistance |
|---|---|---|---|---|
| Example 2 | D-2 | 129 | PP interface | A |
| Example 5 | D-5 | 155 | PP interface | A |
| Example 6 | D-6 | 144 | PP interface | A |
| Example 7 | D-7 | 163 | PP interface | A |
| Example 8 | D-8 | 179 | PP interface | A |
| Example 9 | D-9 | 131 | PP interface | A |
| Example 11 | D-11 | 155 | PP interface | A |
| Example 12 | D-12 | 187 | PP interface | A |
| Example 13 | D-13 | 137 | PP interface | A |
| Example 14 | D-14 | 131 | PP interface | A |
| Comparative Example 2 | D-16 | 100 | PP interface | A |
| Comparative Example 6 | D-20 | 92 | Coating material interface | A |

The invention claimed is:

1. An aqueous dispersion comprising:
(A) a highly modified polyolefin of a polyolefin (a) having a structural unit derived from ethylene and a structural unit derived from propylene and having a melting peak observed by differential scanning calorimetric analysis, by an α,β-unsaturated carboxylic acid compound;
(B) a polyolefin (B-1) having a structural unit derived from at least one olefin selected from the group consisting of ethylene and α-olefins having 3 to 20 carbon atoms, and/or a lowly modified polyolefin (B-2) of the polyolefin (B-1) by an α,β-unsaturated carboxylic acid compound; and
(C) a basic compound;
wherein a mass ratio ((A)/(B)) of the component (A) and the component (B) is 60/40 to 97.5/2.5; and
wherein a melting point of the component (A), as measured by differential scanning calorimetric analysis, is 110° C. or less.

2. The aqueous dispersion according to claim 1, wherein the component (A) is a highly graft-modified polyolefin of the polyolefin (a) by an α,β-unsaturated carboxylic acid compound, and the component (B-2) is a lowly graft-modified polyolefin of the polyolefin (B-1) by an α,β-unsaturated carboxylic acid compound.

3. The aqueous dispersion according to claim 1, wherein an amount of a structural unit derived from an α,β-unsaturated carboxylic acid compound chemically bound to the polyolefin (a) in the component (A) is 2.0 to 50 parts by mass relative to 100 parts by mass of the component (A).

4. The aqueous dispersion according to claim 1, wherein the structural unit derived from ethylene in the polyolefin (a) occupies 5 to 30 mol % based on the total structural unit forming the polyolefin (a).

5. The aqueous dispersion according to claim 1, wherein a weight average molecular weight of the component (A) is 20000 to 200000.

6. The aqueous dispersion according to claim 1, wherein an amount of a structural unit derived from an α,β-unsaturated carboxylic acid compound chemically bound to the polyolefin (B-1) in the polyolefin (B-2) is 0.001 parts by mass or more and less than 2.0 parts by mass relative to 100 parts by mass of the polyolefin (B-2).

7. The aqueous dispersion according to claim 1, wherein a weight average molecular weight of the component (B) is 5000 to 450000.

8. The aqueous dispersion according to claim 1, wherein a volume-based average particle size of a dispersoid in the aqueous dispersion is 2 μm or less.

9. The aqueous dispersion according to claim 1, wherein a proportion of a dispersoid having a particle size of 2 μm or more in the total dispersoid in the aqueous dispersion is 5% or less.

10. The aqueous dispersion according to claim 1, wherein the component (C) is an organic amine compound.

11. A coating film comprising:
(A) a highly modified polyolefin of a polyolefin (a) having a structural unit derived from ethylene and a structural unit derived from propylene and having a melting peak observed by differential scanning calorimetric analysis, by an α,β-unsaturated carboxylic acid compound;
(B) a polyolefin (B-1) having a structural unit derived from at least one olefin selected from the group consisting of ethylene and α-olefins having 3 to 20 carbon atoms, and/or a lowly modified polyolefin (B-2) of the polyolefin (B-1) by an α,β-unsaturated carboxylic acid compound; and
(C) a basic compound;
wherein a mass ratio ((A)/(B)) of the component (A) and the component (B) is 60/40 to 97.5/2.5; and
wherein a melting point of the component (A), as measured by differential scanning calorimetric analysis, is 110° C. or less.

12. A coating film formed from the aqueous dispersion according to claim 1.

13. A laminate comprising, a substrate having a non-polar surface, and the coating film according to claim 11, laminated on the non-polar surface of the substrate.

14. The laminate according to claim 13, wherein the substrate having a non-polar surface is a substrate made of polyolefin.

15. The laminate according to claim 13, further comprising a substrate having a polar surface, laminated on a surface of the coating film opposite to the substrate having the non-polar surface.

\* \* \* \* \*